United States Patent [19]

Wolf et al.

[11] 4,188,368

[45] Feb. 12, 1980

[54] METHOD OF PRODUCING SILICON

[76] Inventors: Robert A. Frosch, Administrator of the National Aeronautics and Space Administration, with respect to an invention of Charles B. Wolf, Irwin; Thomas N. Meyer, Murrysville, both of Pa.

[21] Appl. No.: 891,373

[22] Filed: Mar. 29, 1978

[51] Int. Cl.² ............................................. C01B 33/02
[52] U.S. Cl. .................................. 423/350; 261/118; 422/224
[58] Field of Search ................ 423/349, 350; 261/118; 422/194, 224

[56] References Cited

U.S. PATENT DOCUMENTS

| | | | |
|---|---|---|---|
| 2,916,359 | 12/1959 | Ellis et al. | 423/349 X |
| 3,771,260 | 11/1973 | Arenson | 261/118 X |
| 4,102,764 | 7/1978 | Harvey et al. | 423/350 X |
| 4,102,765 | 7/1978 | Fey et al. | 423/350 X |
| 4,102,985 | 7/1978 | Harvey | 423/350 |

*Primary Examiner*—Jack Cooper
*Attorney, Agent, or Firm*—Monte F. Mott; John R. Manning; Wilfred Grifka

[57] ABSTRACT

A liquid reactant injector assembly especially suited for the injection of liquid reactant into a high temperature metal reductant vapor and carrier gas stream for the production of metal is disclosed. The assembly is especially adapted for the continuous production of high purity silicon by the reduction of $SiCl_4$ with sodium. The assembly includes a refractory-lined, hollow, metal shell having a plurality, suitably ten, equally-spaced, concentric, radially directed ports provided in the shell and wall. A hydraulic, atomizing type, spray nozzle is sealingly mounted in each of the ports recessed from the inner wall surface.

7 Claims, 4 Drawing Figures

Fig. 1.
Fig. 2.
Fig. 4.
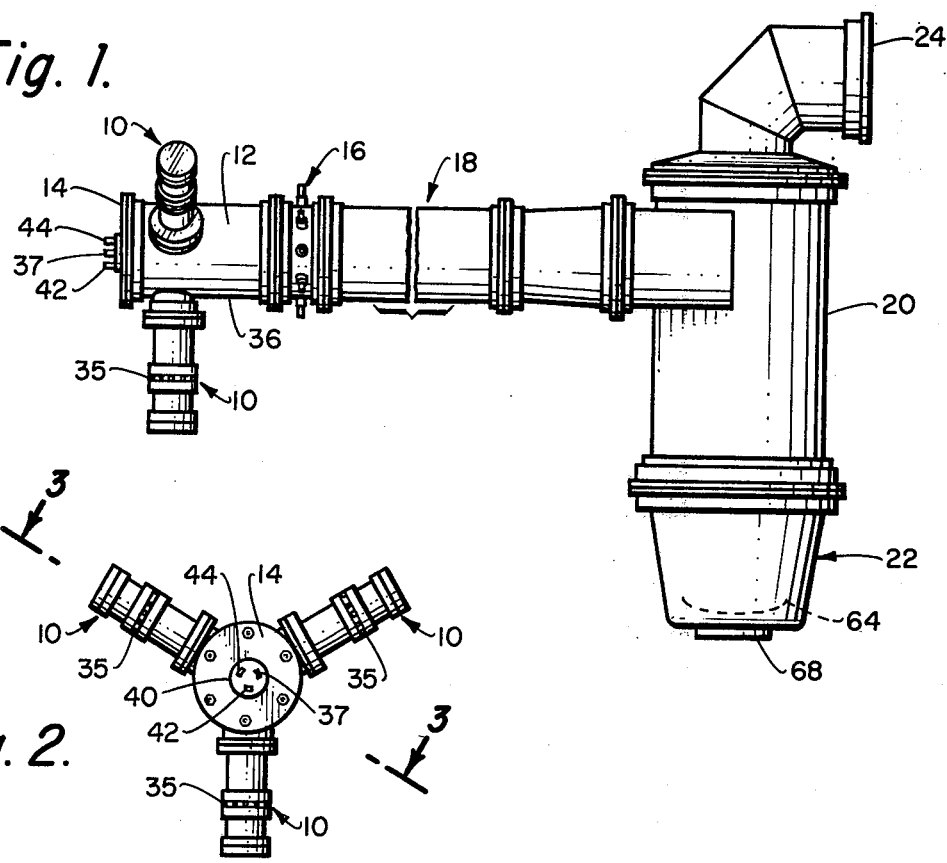
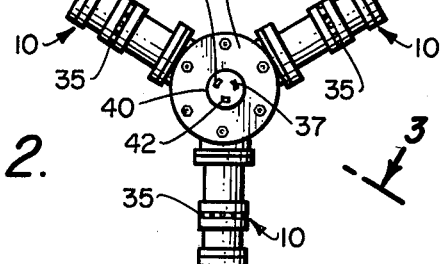
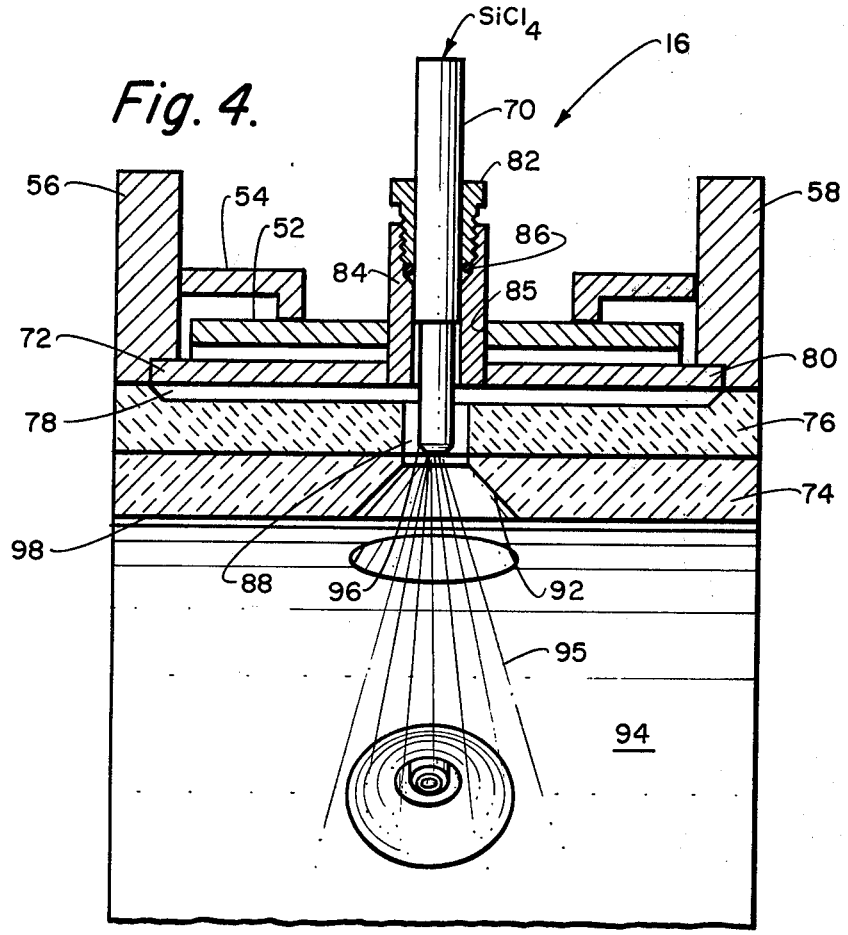

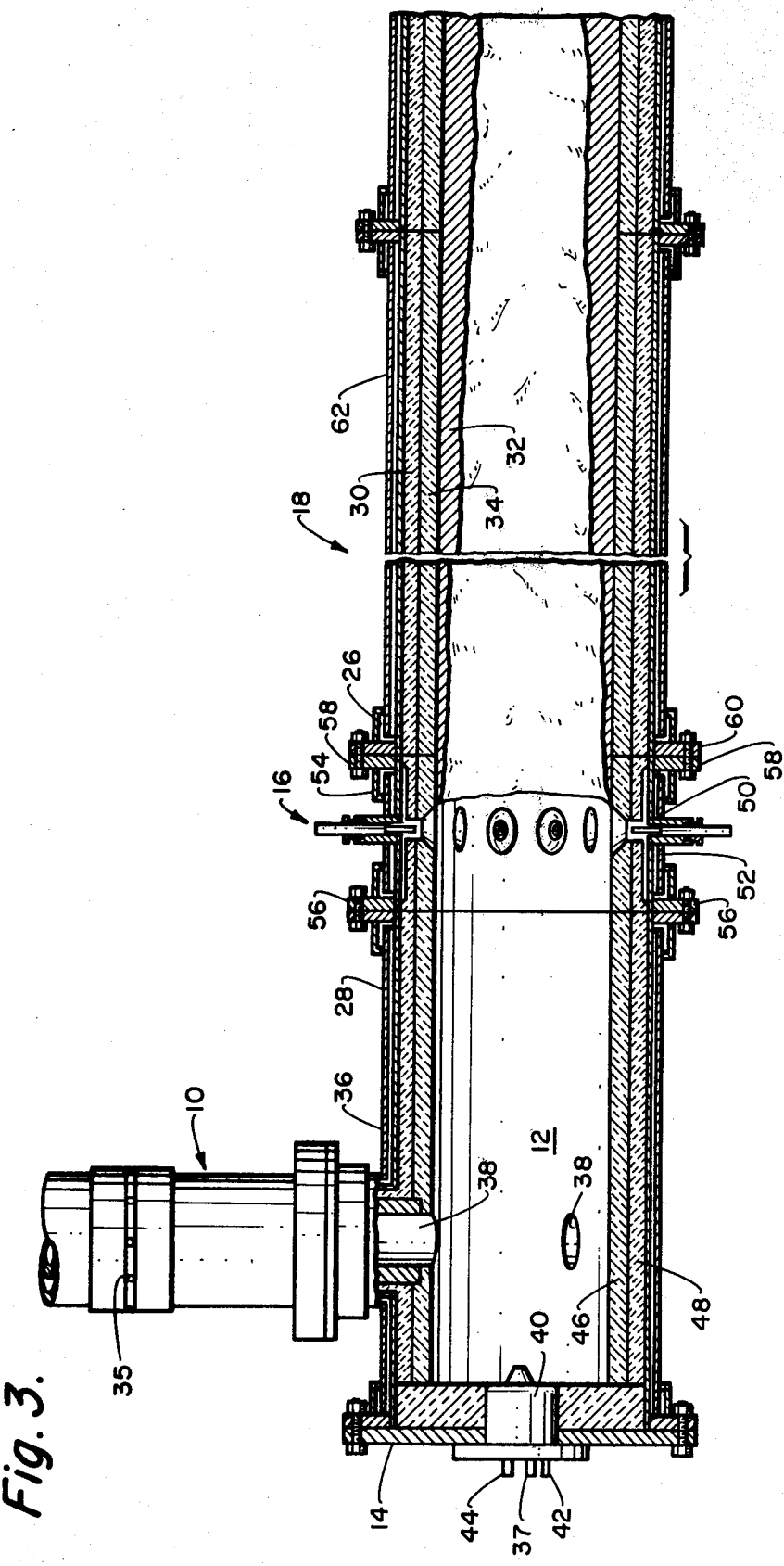

METHOD OF PRODUCING SILICON

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2454).

BACKGROUND OF THE INVENTION

1. Field of the Invention

The present invention relates to a feeder assembly for a high temperature, gas-phase reactor and, more particularly, to a downstream, radially mounted, multiple injector liquid feeder.

2. Description of the Prior Art

There is currently a major effect to develop low cost solar arrays. A primary need is the rapid, high capacity production of good quality silicon at a nominal cost. Present state-of-the art manufacturing processes for producing high purity silicon are generally carried out at temperatures below 1100° C. and are necessarily multi-step in order to separate co-products and to improve purity, when necessary, and for melting and ingot casting. An example of one of these processes is the Siemens-Westinghouse process where trichlorosilane is reduced by hydrogen at a temperature of 950° C. Silicon is then collected by deposition on a surface or rod. Production rates are normally of the order of 10 grams/hr.

A high temperature process is under development in which silicon is produced as a liquid, the co-products are gaseous and the reaction times are very short for the gaseous reactants. Therefore, high silicon production rates may be achieved in relatively small reaction chambers and the liquid silicon be collected and directly cast into ingots. The co-product gases can be recovered and recycled. Electric arc heaters may be utilized to supply heat to a carrier gas such as an argon-hydrogen mixture to heat the reactants to the desired reaction temperature; i.e. 2000°-2200° K.

A stream of reducing agent such as a Group I or II metal, particularly sodium, magnesium or zinc, and a stream of vaporized or atomized SiCl$_4$ reactant are injected concurrently into the carrier gas plasma, are vaporized and react to form high purity liquid silicon and by-product gaseous salt according to the following basic reaction, when assuming a sodium reactant:

$$4Na + SiCl_4 \rightarrow Si(l) + 4NaCl(g)$$

The by-product salt produced and the carrier gas can be recycled after the silicon has been separated. This process can be run in a batch or continuous mode. The reactor system includes an axial section for injection of the reductant into the arc-heated plasma, a downstream reactor section including a SiCl$_4$ injection system, a reaction and particle growth section and a separation and product collection assembly. The reactor section has an equilibrium wall (skull wall) of solid silicon. The injection of SiCl$_4$ must be accomplished in a manner which does not cool the inner wall below the temperature necessary for the equilibrium skull wall.

The introduction of SiCl$_4$ must also be conducted in a manner to promote rapid dispersion and mixing in the reductant stream so that the reaction can take place quickly and completely. The preferred method of introduction of SiCl$_4$ is as liquid by means of a hydraulic atomizing nozzle. The introduction of SiCl$_4$ as a gas would not provide complete mixing since a significant portion of the SiCl$_4$ gas stream would be deflected by the axially flowing reductant stream.

SUMMARY OF THE INVENTION

An improved reagent feeder system is provided in accordance with this invention. The system is less complex than gaseous feeding and is subject to less deposition and contamination. In the system of the invention, the downstream reagent is fed into the axial stream as a liquid rather than as a gas. Liquid feeding is superior to gaseous feeding in that more complete and rapid dispersion of the reagent occur due to the boiling action of the liquid and by the fact that the liquid will penetrate the axial stream rather than be greatly deflected by it.

The invention prevents excessive cooling of the inner wall surfaces of the reactor when contacted by the relatively cool reagent material—thus causing undesired condensation and building of reductant and reaction products—by specially shaped and sized entry ports and by recess of the nozzle tip of the injectors. Rapid and uniform mixing is also fostered by the provision of a plurality of radially-disposed, equally-spaced nozzles, each being mounted in an entry port.

These and many other features and attendant advantages of the invention will become apparent as the invention becomes better understood by reference to the following detailed descriptions when considered in conjunction with the accompanying drawings.

BRIEF DESCRIPTION OF THE DRAWINGS

FIG. 1 is a front elevational view of a reactor/separator for production of silicon;

FIG. 2 is an end elevational view of the reactor;

FIG. 3 is a cross-sectional view taken along line 3—3 of FIG. 2; and

FIG. 4 is an enlarged view in section of the liquid reagent feeder assembly.

DESCRIPTION OF THE PREFERRED EMBODIMENTS

Referring now to FIGS. 1 to 3, the reactor consists primarily of a plurality of equally spaced arc heaters 10 connected to a common plenum 12, an upstream liquid metal reductant injector assembly 14, a downstream SiCl$_4$ liquid injector assembly 16, a reaction chamber 18, a cyclone separator 20, silicon metal collector 22, and an effluent withdrawal duct 24. All components of the reactor are water cooled by flowing water through annular passages 26 incorporated into the wall 28 of the reactor sections. The interior surface of the reactor walls are lined with a layer of high temperature resistant material 30 upon which an equilibrium layer 32 of the product silicon will be deposited. An intermediate refractory layer 34, of thermal insulation material may be provided adjacent the wall 28.

The carrier gases introduced through inlets 35 are generally heated by a plurality of single phase arc heaters 10 such as three arc heaters connected to a common tubular plenum 12. Electrically, the arc heaters are Y-connected with the common grounded neutral comprising the downstream end of each arc heater and the plenum itself. The details of the arc heaters and the three-phase arrangement are described in U.S. Pat. No. 4,013,867, the disclosure of which is expressly incorporated herein by reference. Heat transfer carrier gas such as a mixture of hydrogen and argon passes through the arc heaters and into the plenum at a temperature of 3000° K. to 4000° K.

The plenum 12 is formed of a tubular member 36 with radial port openings 38 for receiving arc heaters 10 and with axial openings for upstream and downstream connections. The length of this section is sufficient to provide complete vaporization of the sodium droplets. A 40-inch length is adequate to vaporize all sodium droplets less than 100 microns in diameter.

The sodium injector assembly 14 is connected to the upstream end of the plenum 12. Liquid metal, usually sodium, is pumped to the injector 14 at a predetermined rate. It is passed through a sonic gas admission region which disperses the liquid into droplets that are less than 100 microns in diameter. The droplets can be completely vaporized within plenum 12 by the arc-heated, high-temperature, carrier gas. The sodium injector nozzle 37 must be heated at start-up and cooled during full power operation to prevent possible freeze-up and clogging of sodium passages. This is best accomplished by a separate, auxilliary liquid metal cooling-heating system which circulates a heat exchange liquid metal such as a sodium-potassium alloy through a cavity 40 surrounding the nozzle 37 and which is connected to inlet 42 and outlet 44. This also avoids possible contact of sodium with water. Exposed interior surfaces of the injector are covered where possible with a layer of insulation 46 and an inner layer 48 of high temperature material to limit the heat loss.

The $SiCl_4$ liquid injector assembly 16 comprises a short tubular member 50 having a hollow shell 52 defining water cooling passages 54 and having an upstream end flange 56 for connection to the downstream end of the plenum and a downstream flange 58 for connection to the reaction chamber flange 60. Further details will be discussed below in the description of FIG. 4.

The reaction and particle growth section 18 is composed of one or more water cooled, refractory-lined tubular sections 62. The reaction is complete within a very short travel after $SiCl_4$ injection. Most of the length of this section is provided for silicon product formation which takes place by diffusion enhanced by the turbulence of the gas stream.

The cyclone separator 20 is provided to separate the liquid silicon from the co-product gaseous salt and carrier gas; liquid silicon being collected at the lower-portion within the crucible 64 and the by-product gases leave the top portion through the effluent withdrawal duct 24.

The silicon collector 22 is bolted to the bottom of the cyclone 20. The crucible 64 contains a valve 68 in order to remove the liquid silicon for subsequent processing to single crystalline product.

Again, all of the sections with the exception of the Arc Heaters, are lined with a combination of tubular shaped graphic and refractory materials. Additionally, and very importantly, the walls are designed to operate at a temperature below the melting point of silicon. This will cause a solidified layer or "skull" wall 32 of silicon to build to an equilibrium thickness. The advantage of the skull wall is, of course, to greatly restrict the rate of contamination of the silicon product from the wall materials. Solar grade silicon, for instance, requires very high purity material for high cell efficiency. Surrounding the skull wall is a layer of high purity graphite which has been infused or coated with silicon carbide or silicon nitride to limit the rate of diffusion of carbon into the products. The graphite is approximately one inch thick. Between the graphite and the outer metal shell is a layer of insulating refractory such as cast alumina or silica. The refractory thickness is dictated by its thermal conductivity and the rate of heat transfer required to maintain and limit the skull wall thickness.

A more detailed view of the $SiCl_4$ injector assembly 16 is illustrated in FIG. 4. The assembly is designed to be inserted between the sodium vaporizer and reactor sections as a separate replaceable unit. The assembly includes a plurality of at least 6, typically 10 equally spaced, radially directed hydraulic atomizing-type injection spray nozzles 70. Inner wall 72 of the tubular shell 50 is lined with an inner layer 74 of graphite which has been coated or infused with SiC or SiN and an intermediate layer 76 of an insulating refractory such as castable alumina or silica. In areas of low wall heat flux a radiative/gas conduction space 78 can be provided to effectively separate the outer wall 80 from the refractory liner 76.

Each nozzle 70 is engaged by a threaded collar 82 and is received within a threaded nozzle mount 84 radially mounted within a port 85 in the double wall 50. An O-ring seal 86 is provided around each spray nozzle to seal the nozzle and to maintain the radial nozzle position.

Openings are provided through layers 74 and 76 concentric with the port 85. The opening 88 through outer layer 76 is of larger diameter than nozzle tip 96 and provides a passage communicating with the radiative gas conduction space 78. The opening 92 through the inner layer 74 is of frusto-conical shape diverging towards the chamber 94. The nozzle tip 96 is recessed a small amount from 1 to 5 cm, generally about 2 cm from the surface 98 of the inner wall 74. The extension of the tip may be adjusted by rotating threaded collar 82 to optimize mixing. The nozzle tip is selected on the basis of feed rate requirements, droplet size produced, spray pattern and droplet velocity. The injection nozzles provide a droplet stream 95 having a dispersion angle not exceeding 90°.

The liquid reactant feeder assembly of the invention is suitable for injecting and rapidly dispersing liquid reactant into a high temperature gas stream to enhance turbulence and reaction rate. The recessed disposition of the nozzle tip and the special configuration of the entry ports prevent excessive cooling of the interior surfaces by contacting the relatively cool liquid reactant. Thus, undesired condensation and buildup of sodium reductant, sodium chloride, or silicon product is avoided.

In the operation of the system the arc heaters will heat a mixture of $H_2$/Argon carrier gas. The carrier gas can partially or completely vaporize the sodium reductant. The water cooling system maintains the inner refractory wall at a temperature below the melting point of silicon. The liquid $SiCl_4$ is injected into the high temperature stream in a manner to cause intimate mixing. Silicon liquid forms and deposits on the inner wall while the NaCl salt is vaporized. Eventually, a layer of solid silicon is formed and further amounts of liquid silicon moves down the wall to the collector.

The carrier gas can be processed for recycling through a condenser and filter to remove NaCl, Si and Na. The solids recovered from the condenser can be utilized as a feed to a Down's electrolytic cell or they can be drummed for burial. The silicon tetrochloride injectors can be further protected from contamination by flowing a cover gas around each nozzle to protect the nozzle and to prevent SiCl$_4$(l) or other feed from contacting the graphite or refractory layers. Another benefit of the admission of a cover gas is to minimize aspiration of sodium filled carrier gas to the cold walls where condensation would occur.

It is to be realized that only preferred embodiments of this invention have been disclosed and that numerous substitutions, alterations and modifications are all permissible without departing from the spirit or scope of the invention as defined in the following claims.

What is claimed is:

1. A method of producing silicon comprising the steps of:
    establishing an axially flowing stream of a heated carrier gas containing a dispersion of partially or completely vaporized reductant for SiCl$_4$ selected from sodium, magnesium or zinc upstream of the point of injection of SiCl$_4$, said carrier gas dispersion being at a temperature above the melting point of silicon;
    injecting SiCl$_4$ as liquid spray transversely into the axially flowing dispersion stream from a plurality of radially directed nozzles, equally spaced around the periphery of the stream and each nozzle being sealingly mounted in a port in a wall portion surrounding said stream with the outlet tip of each nozzle being recessed at least 1 cm from the inner wall surface whereby said SiCl$_4$ liquid vaporizes within the stream;
    reducing the vaporized SiCl$_4$ with the reductant within the axial stream to form liquid silicon;
    depositing the liquid silicon downstream of the point of injection on a surface of a wall surrounding the axial stream and extending downstream of said point of injection;
    flowing the liquid silicon down the surface of said wall; and
    collecting and recovering the liquid silicon.

2. A method according to claim 1 in which the carrier gas is a mixture of argon and hydrogen heated to a temperature of at least 2000° C.

3. A method according to claim 1 in which the port terminates in a conical diverging pattern.

4. A method according to claim 3 in which the nozzle sprays a droplet stream having a conical dispersion angle not exceeding 90 degrees.

5. A method according to claim 1 in which the wall is formed of a first inner layer of graphite coated with silicon carbide or silicon nitride, an intermediate layer of insulating refractory and an outer hollow metal shell.

6. A method according to claim 1 in which the recess is from 1 to 5 cm.

7. A method according to claim 1 in which said wall surrounding the axial stream is horizontally disposed.

* * * * *